(12) United States Patent
Li et al.

(10) Patent No.: US 11,937,540 B2
(45) Date of Patent: Mar. 26, 2024

(54) STRING TRIMMER (71) Applicant: Nanjing Chervon Industry Co., Ltd., Nanjing (CN)

(72) Inventors: Li Li, Nanjing (CN); Kaichao Dai, Nanjing (CN)

(73) Assignee: Nanjing Chervon Industry Co., Ltd., Nanjing (CN)

(*) Notice: Subject to any disclaimer, the term of this patent is extended or adjusted under 35 U.S.C. 154(b) by 211 days.

(21) Appl. No.: 17/211,985

(22) Filed: Mar. 25, 2021

(65) Prior Publication Data
US 2021/0307246 A1  Oct. 7, 2021

(30) Foreign Application Priority Data

Apr. 3, 2020  (CN) .......................... 202010258996.1

(51) Int. Cl.
*A01D 34/416* (2006.01)
*A01D 34/84* (2006.01)
*A01D 34/90* (2006.01)

(52) U.S. Cl.
CPC ........... *A01D 34/416* (2013.01); *A01D 34/90* (2013.01); *A01D 34/84* (2013.01)

(58) Field of Classification Search
CPC ...... A01D 34/416; A01D 34/90; A01D 34/84; A01D 34/4166; A01D 34/4161
USPC .................................................. 30/276, 347
See application file for complete search history.

(56) References Cited

U.S. PATENT DOCUMENTS

| | | | | |
|---|---|---|---|---|
| 4,107,901 A | * | 8/1978 | Moore | A01D 34/4161 56/295 |
| 4,189,905 A | * | 2/1980 | Frantello | A01D 34/416 30/276 |
| 4,335,510 A | * | 6/1982 | Close | A01D 34/4161 30/276 |
| 4,366,622 A | * | 1/1983 | Lombard | A01D 34/4162 30/276 |
| 5,276,969 A | | 1/1994 | Luick | |

(Continued)

FOREIGN PATENT DOCUMENTS

| | | | |
|---|---|---|---|
| CN | 109691318 A | | 4/2019 |
| CN | 209234276 U | * | 8/2019 |

(Continued)

OTHER PUBLICATIONS

EPO, extended European search report issued on European publication No. 3892080, dated Sep. 10, 2021, 5 pages.

*Primary Examiner* — Laura M Lee
(74) *Attorney, Agent, or Firm* — Greenberg Traurig, LLP (57) ABSTRACT

The string trimmer includes a connecting rod, a string trimmer head, and an operation part. The string trimmer head includes a trimmer line, a spool, a housing, and a streamlined protection structure. The spool is configured to wind the trimmer line and is capable of rotating about a first axis. The housing has an accommodating cavity for accommodating at least part of the spool and a threading hole for the trimmer line to extend to an outer side of the housing. The protection structure includes a head, a tail and a passage through which the trimmer line penetrates. The head is connected to the housing, the tail extends on the outer side of the housing, and the passage is configured to accommodate the trimmer line penetrating through the threading hole and expose the trimmer line out of the tail of the protection structure.

13 Claims, 10 Drawing Sheets

(56) References Cited

U.S. PATENT DOCUMENTS

| | | | | |
|---|---|---|---|---|
| 5,761,816 A | * | 6/1998 | Morabit | A01D 34/4168 |
| | | | | 428/397 |
| 5,887,348 A | * | 3/1999 | Iacona | A01D 34/4166 |
| | | | | 56/294 |
| 5,996,233 A | * | 12/1999 | Morabit | A01D 34/4168 |
| | | | | 30/276 |
| 10,537,057 B2 | | 1/2020 | Sergyeyenko et al. | |
| 2001/0003935 A1 | * | 6/2001 | Morabit | A01D 34/4166 |
| | | | | 83/13 |
| 2007/0028459 A1 | * | 2/2007 | Thomson | A01D 34/4168 |
| | | | | 362/120 |
| 2008/0083120 A1 | | 4/2008 | Alliss | |
| 2011/0225832 A1 | | 9/2011 | Alliss | |
| 2014/0325851 A1 | * | 11/2014 | Bone | A01D 34/4161 |
| | | | | 30/276 |
| 2018/0184588 A1 | * | 7/2018 | Morabit | A01D 34/4166 |
| 2020/0305343 A1 | * | 10/2020 | Morabit | A01D 34/4166 |

FOREIGN PATENT DOCUMENTS

| | | | | |
|---|---|---|---|---|
| CN | 209234276 U | | 8/2019 | |
| JP | 08037872 A | * | 2/1996 | |
| JP | 2014143981 A | * | 8/2014 | A01D 34/73 |
| WO | WO-8702215 A1 | * | 4/1987 | A01D 34/4166 |
| WO | WO-2007052311 A1 | * | 5/2007 | A01D 34/4163 |
| WO | WO-2019089666 A1 | * | 5/2019 | A01D 34/4163 |

\* cited by examiner

STRING TRIMMER

RELATED APPLICATION INFORMATION

This application claims the benefit under 35 U.S.C. § 119(a) of Chinese Patent Application No. CN 202010258996.1, filed on Apr. 3, 2020, which is incorporated by reference in its entirety herein.

BACKGROUND

A string trimmer is one of the commonly used garden tools and is welcomed by gardeners due to a small size, a light weight and convenience for operation. Currently, a common string trimmer typically includes three parts: a string trimmer head, a handle, and an operating rod connecting the string trimmer head to the handle, and a user trims grass by holding the handle. The string trimmer head that rotates at a high speed drives a trimmer line installed thereon to rotate rapidly to form an annular cutting wheel to cut grass stems.

When an existing trimmer line rotates at a high speed, the trimmer line hits hard obstacles such as fire hydrants and shrubs easily so that the trimmer line curls and breaks off. The trimmer line that rotates at a high speed frequently rubs against a housing of the string trimmer head and is easily worn and even breaks off at the root. When the trimmer line rotates at a certain speed, a rotation boundary is blurred and it is difficult for the user to determine a length of the trimmer line, that is, a trimming range. In particular, it is inconvenient for a staff to stop to observe the rotation boundary carefully in an operation process, so that the staff can only operate based on feelings, and the trimmer line hits obstacles such as fire hydrants and shrubs easily. As a result, the trimmer line is damaged. In addition, the trimmer line generates pretty large pneumatic noise, resulting in noise pollution.

SUMMARY

In one example of the disclosure, a string trimmer includes a connecting rod, a string trimmer head, and an operation part. The string trimmer head is disposed at one end of the connecting rod and the operation part is disposed at the other end of the connecting rod. The string trimmer head includes a trimmer line, a spool, a housing, and a streamlined protection structure. The spool is configured to wind the trimmer line and is capable of rotating about a first axis. The housing has an accommodating cavity for accommodating at least part of the spool, and the housing is provided with a threading hole for the trimmer line to extend to an outer side of the housing. The protection structure includes a head, a tail, and a passage through which the trimmer line penetrates, where the head is connected to the housing, and the passage is configured to accommodate the trimmer line penetrating through the threading hole and expose the trimmer line out of the tail of the protection structure.

In one example, the housing is connected with a rotating shaft and the protection structure is rotatably sleeved on the rotating shaft.

In one example, the head is connected to the tail in a smooth transition manner, the head is rotatably sleeved on the rotating shaft and has a first passage, the tail has a second passage communicating with the first passage, and the first passage and the second passage form the passage.

In one example, the tail of the protection structure has a section which is a streamlined structure with a circular front and a cuspate rear.

In one example, the protection structure is provided with an identification part configured to display a rotation outline of the protection structure.

In one example, the identification part is disposed at a peripheral side of the protection structure or at a tail end of the tail.

In one example, the identification part includes a fluorescent coating, a light-emitting element, or a warning mark.

In one example, the passage is a through hole structure or a through groove structure.

In one example, the protection structure includes a first body and a second body and the first body and the second body are opened and locked through a locking mechanism.

In one example, the protection structure has a length in a range of 35 mm to 70 mm and a width in a range of 11 mm to 30 mm.

In one example, the trimmer line is configured to enter the accommodating cavity from the head through the threading hole and be wound round the spool.

In one example, the protection structure is rotatably connected to the housing.

In one example, part of the trimmer line is wound on the spool, and part of the trimmer line passes through the passage.

In one example, the string trimmer head includes two of the protection structures.

In one example of the disclosure, a string trimmer head includes a spool configured to wind a trimmer line and capable of rotating about a first axis, a housing provided with an accommodating cavity for accommodating at least part of the spool and provided with a threading hole for the trimmer line to extend to an outer side of the housing, and a protection structure provided with a passage through which the trimmer line passes. The protection structure includes a head and a tail, the head is connected to the housing, the tail extends on the outer side of the housing, and the passage is configured to accommodate the trimmer line penetrating through the threading hole and expose the trimmer line out of the tail of the protection structure.

In one example, the protection structure is streamlined.

In one example, the protection structure is provided with an identification part configured to display a rotation outline of the protection structure.

In one example of the disclosure, a string trimmer includes a connecting rod, a string trimmer head, and an operation part. The string trimmer head is disposed at one end of the connecting rod and the operation part is disposed at the other end of the connecting rod. The string trimmer head includes a trimmer rope, a spool, a housing, and a protection structure. The spool is configured to wind the trimmer line and capable of rotating about a first axis. The housing has an accommodating cavity for accommodating at least part of the spool, and the housing is provided with a threading hole for the trimmer line to extend to an outer side of the housing. The protection structure includes a head, a tail, and a passage through which the trimmer line penetrates, where the head is connected to the housing, the tail extends on the outer side of the housing, and the passage is configured to accommodate the trimmer line penetrating through the threading hole and expose the trimmer line out of the tail of the protection structure.

The string trimmer provided by the present disclosure is provided with the protection structure to support and protect the trimmer line. The protection structure rotates synchronously with the trimmer line and can prevent the trimmer line from curling and rubbing against the housing of the string trimmer head compared with the related art, thus reducing wear of the root of the trimmer line and reducing the risk of breakage of the trimmer line at the root. An area of a projection of the protection structure is greater than an area of a projection of the trimmer line so that an operator can see the rotation boundary of the protection structure clearly in a rotation process, solving the problem of visualization of the trimmer line. Meanwhile, the streamlined protection structure can effectively avoid the pneumatic noise during the operation of the trimmer line.

DETAILED DESCRIPTION

The solutions to the problems set forth above are now described by way of examples in conjunction with the accompanying drawings.

In the description of the present disclosure, unless otherwise expressly specified and limited, the term "connected to each other", "connected" or "fixed" is to be construed in a broad sense, for example, as permanently connected, detachably connected, or integrated; mechanically connected or electrically connected; directly connected to each other or indirectly connected to each other via an intermediary; or internally connected or interactional between two components. For those of ordinary skill in the art, the specific meanings of the above terms in the present disclosure may be understood based on specific circumstances.

In the present disclosure, unless otherwise expressly specified and limited, when a first feature is described as "above" or "below" a second feature, the first feature and the second feature may be in direct contact or be in contact via another feature between the two features. Moreover, when the first feature is described as "on", "above" or "over" the second feature, the first feature is right on, above, or over the second feature or the first feature is obliquely on, above, or over the second feature, or the first feature is simply at a higher level than the second feature. When the first feature is described as "under", "below" or "underneath" the second feature, the first feature is right under, below, or underneath the second feature or the first feature is obliquely under, below, or underneath the second feature, or the first feature is simply at a lower level than the second feature.

In the description of the example, the orientation or position relationships indicated by terms "above", "below", "left", "right" and the like are based on the orientation or position relationships shown in the drawings, merely for facilitating description of the present disclosure and simplifying operation, and these relationships do not indicate or imply that the referred device or element has a specific orientation and is constructed and operated in a specific orientation, and thus it is not to be construed as limiting the present disclosure. In addition, the terms "first" and "second" are merely used for descriptive purposes and have no special meanings.

Figure 1:
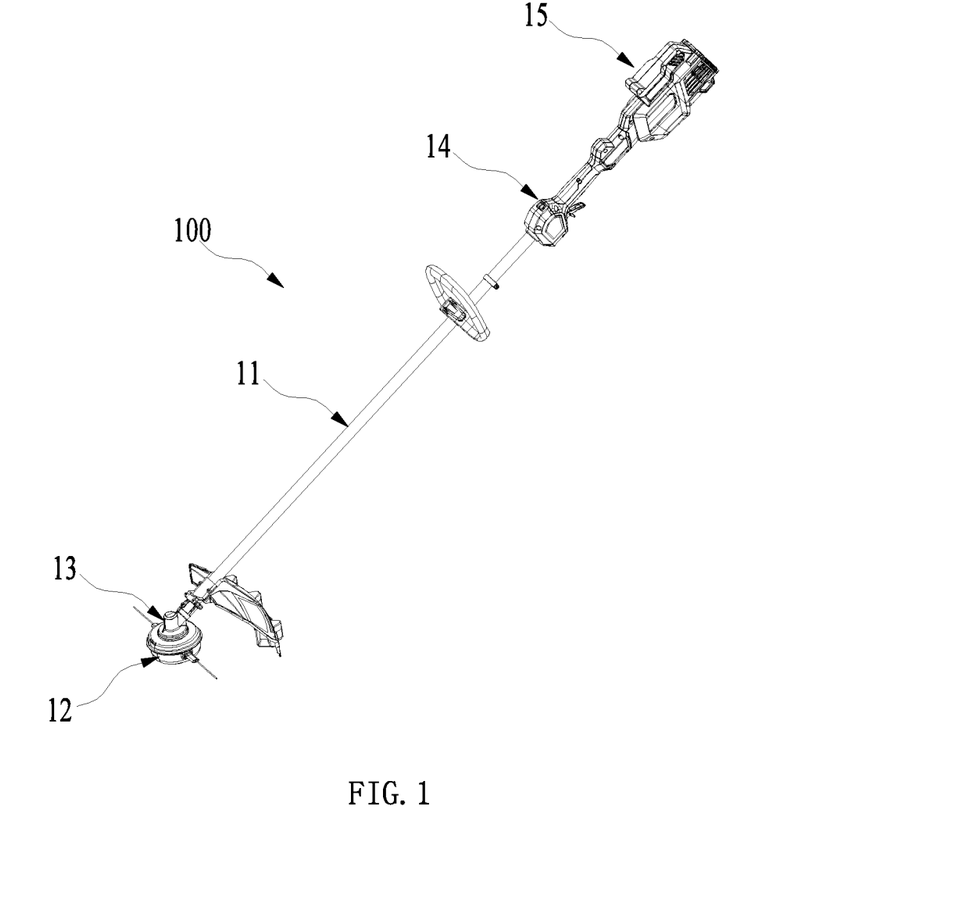
FIG. 1 is a view of a string trimmer according to an example of the present disclosure.
Figure 2:
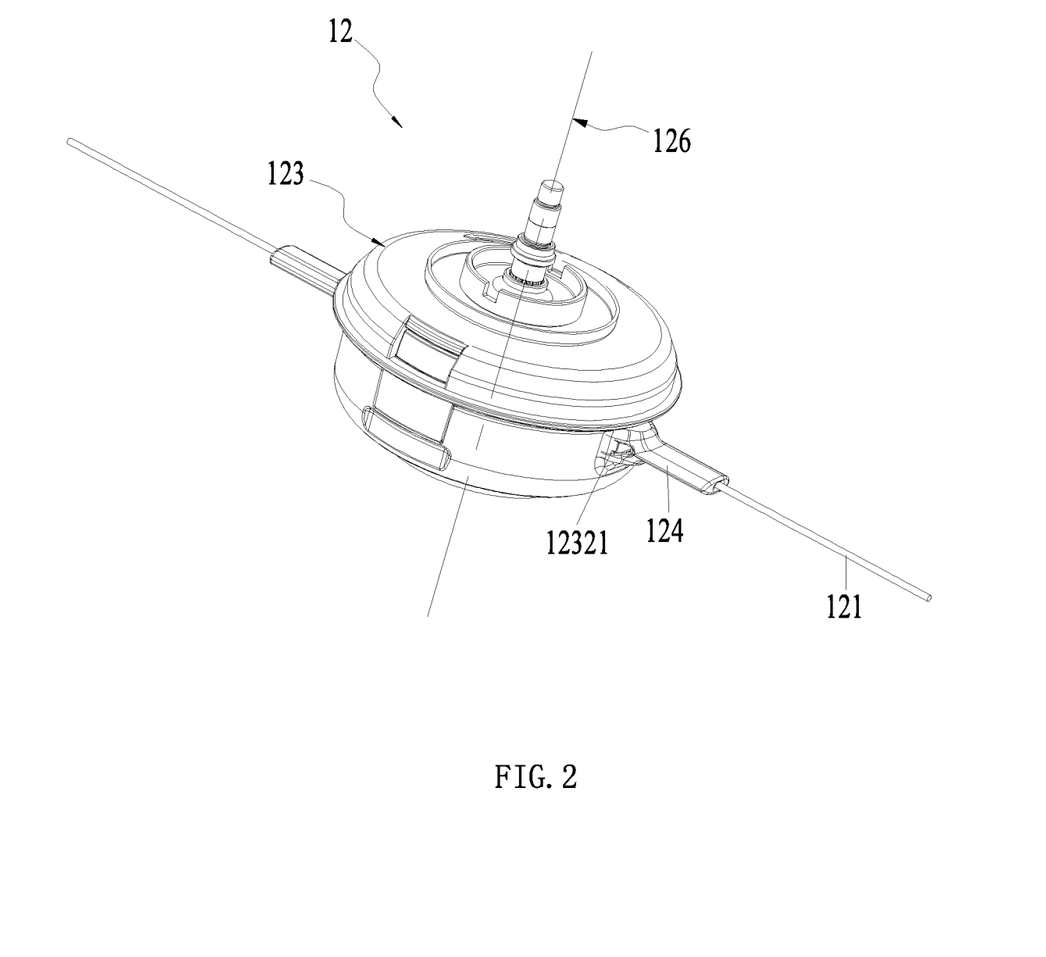
FIG. 2 is a perspective view of a string trimmer head in FIG. 1.
Figure 3:
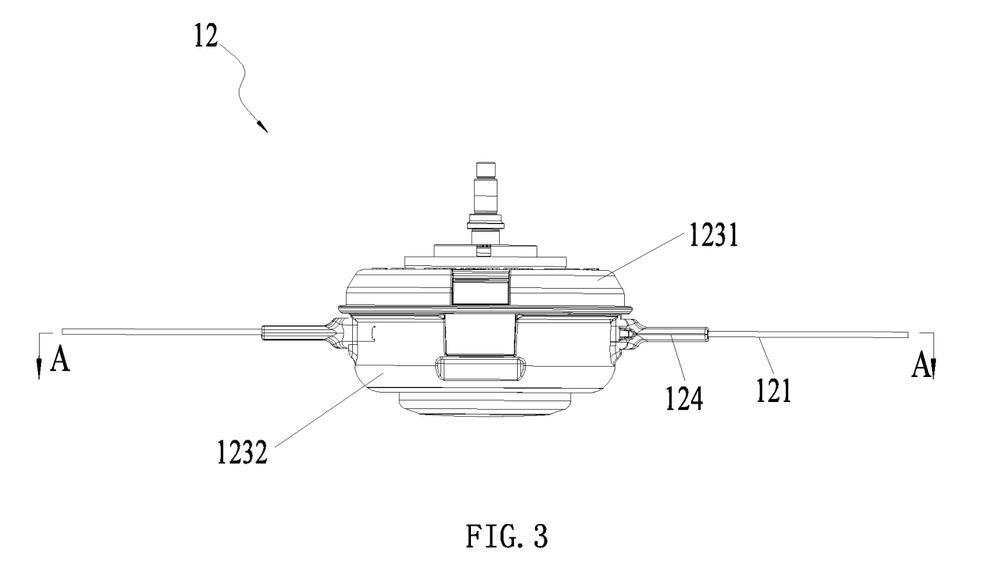
FIG. 3 is a plan view of the string trimmer head in FIG. 2.
Figure 4:
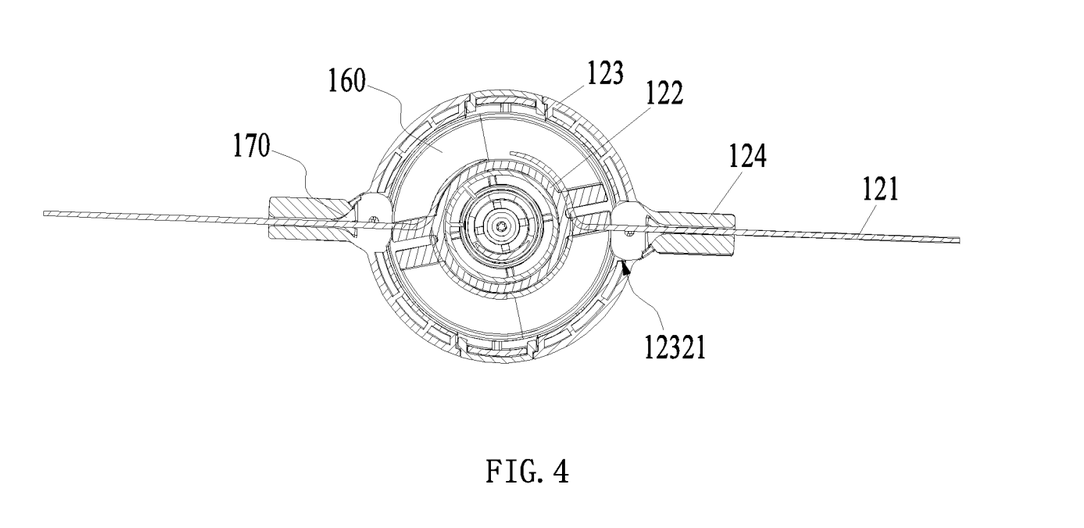
FIG. 4 is a cross-sectional view along a section line A-A according to FIG. 3.
Figure 5:
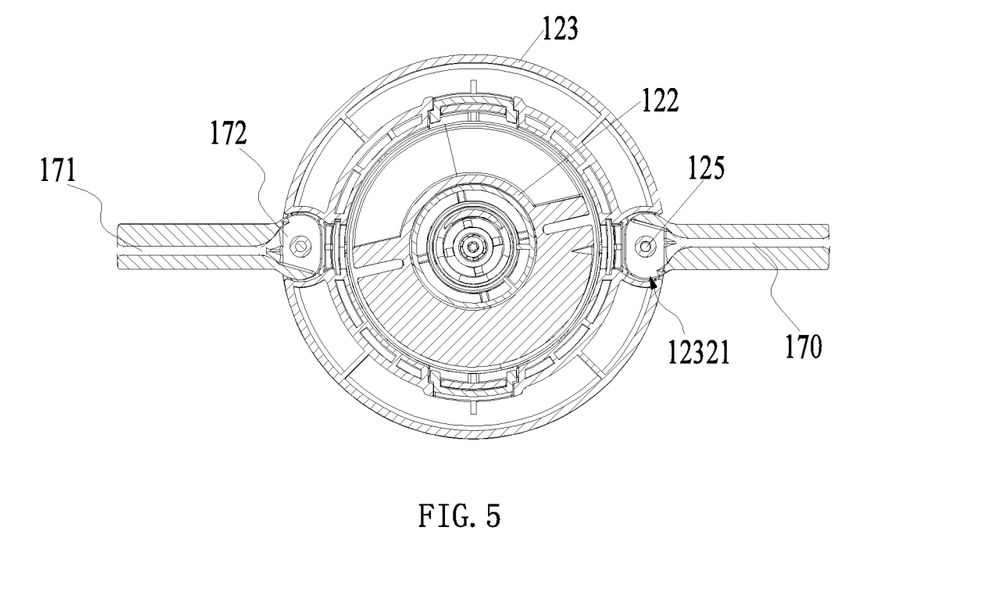
FIG. 5 is a cross-sectional view of a partial structure of the string trimmer head in FIG. 3.
Figure 6:
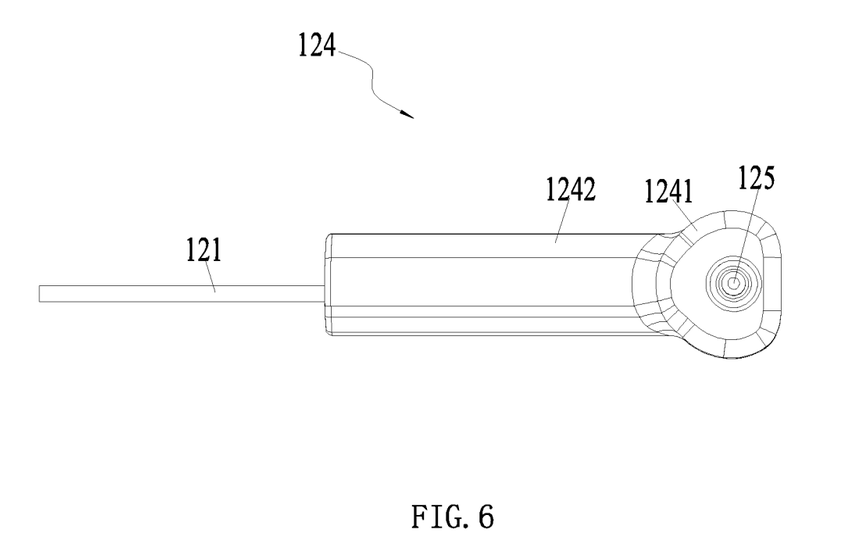
FIG. 6 is a top view of a protection structure of the string trimmer head in FIG. 3.
Figure 7:
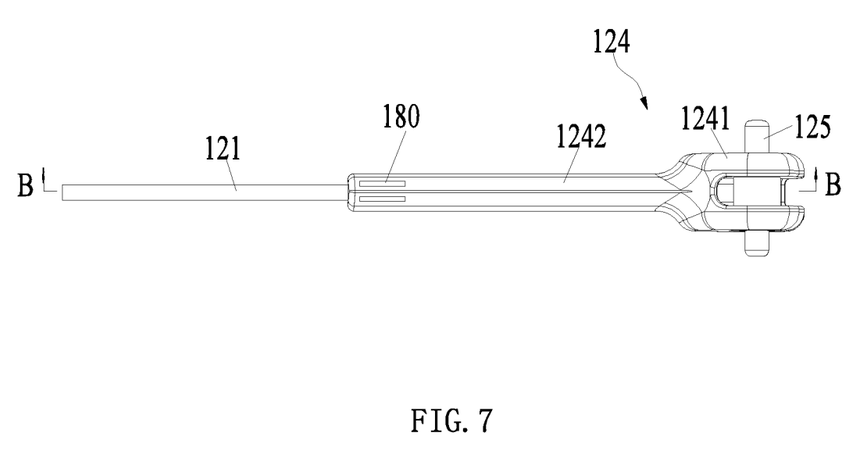
FIG. 7 is a front view of the protection structure of the string trimmer head in FIG. 3.
Figure 8:
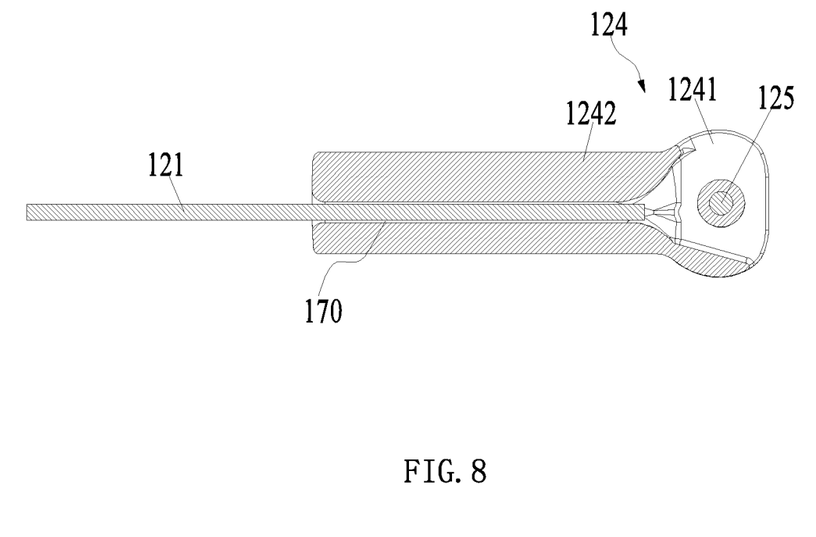
FIG. 8 is a cross-sectional view along a section line B-B according to FIG. 7.

As shown in FIG. 1 and FIG. 2, a string trimmer 100 includes a connecting rod 11, a string trimmer head 12, a driving part 13, an operation part 14, and a joining part 15. One end of the connecting rod 11 is connected to the driving part 13 and the other end of the connecting rod 11 is connected to the operation part 14. The joining part 15 is disposed at an end of the operation part 14 further away from the connecting rod 11. The string trimmer head 12 is connected to the driving part 13 and can trim grass when driven by the driving part 13. The joining part 15 is configured to connect a power supply device. The operation part 14 is operable by a user to control the string trimmer 100. The string trimmer 100 can not only reduce the risk of breakage of a trimmer line 121 at the root, reduce maintenance and replacement costs, and prolong the service life of the string trimmer 100, but also achieve the visualization of the trimmer line 121 and effectively reduce pneumatic noise during an operation of the trimmer line 121.

As shown in FIGS. 2-5, the string trimmer head 12 includes the trimmer line 121, a spool 122, a housing 123, and a protection structure 124. The housing 123 includes an upper housing 1231 and a lower housing 1232, the upper housing 1231 is connected to the lower housing 1232 as a whole through a snap, the upper housing 1231 is engaged with the lower housing 1232 to form an accommodating cavity 160, and at least part of the spool 122 is disposed inside the accommodating cavity 160. The spool 122 is configured to wind the trimmer line 121 and is capable of rotating about a first axis 126. The first axis 126 is a central axis about which the string trimmer head 12 rotates, and the trimmer line 121 is configured to trim grass. The lower housing 1232 is further provided with a threading hole 12321 for the trimmer line 121 to extend to an outer side of the housing 123 and a portion of the trimmer line 121 extending out of the housing 123 can cut off grass stems when the trimmer line 121 rotates at a high speed. The protection structure 124 is streamlined and extends in a radial direction of the housing 123. As shown in FIGS. 5-8, the protection structure 124 includes a head 1241 and a tail 1242 connected to each other and has a passage 170 through which the trimmer line 121 penetrates. The head 1241 is connected to the housing 123, the tail 1242 extends on the outer side of the housing 123, and the passage 170 is configured to accommodate the trimmer line 121 penetrating through the threading hole 12321 and expose the trimmer line 121 out of the tail 1242 of the protection structure 124 so as to achieve grass trimming. The trimmer line 121 enters the accommodating cavity 160 from the head 1241 through the threading hole 12321 and is wound round the spool 122.

The protection structure 124 is provided to support and protect the trimmer line 121. The protection structure 124 rotates synchronously with the trimmer line 121 and can prevent the trimmer line 121 from curling and rubbing against the housing 123 of the string trimmer head 12 compared with the related art, thus reducing wear of the root of the trimmer line 121 and reducing the risk of breakage of the trimmer line 121 at the root. A width of the projection of the protection structure 124 is greater than a width of the projection of the trimmer line 121 so that an operator can see the rotation boundary of the protection structure 124 clearly in a rotation process, solving the problem of visualization of the trimmer line 121. Meanwhile, the streamlined protection structure 124 can effectively avoid the pneumatic noise during the operation of the trimmer line 121, thus reducing noise pollution.

Furthermore, a rotating shaft 125 is disposed on the housing 123 at the threading hole 12321, an extension direction of the rotating shaft 125 is parallel to the first axis 126, and the protection structure 124 is rotatably sleeved on the rotating shaft 125 so that the protection structure 124 has a circumferential rotation margin when the protection structure 124 rotates with the trimmer line 121, thereby improving structural flexibility and reducing damages to the protection structure 124. In addition, the protection structure 124 can be detached from the housing 123 at the rotating shaft 125 and thus replaced. The rotating shaft 125 is provided so that the protection structure 124 can rotate with respect to the housing 123 and can rotate to avoid stuff encountered in the trimming process, thereby reducing the strength of collision with the stuff and prolonging the service life of the protection structure 124. Optionally, the rotating shaft 125 has a cylindrical structure, and a height of the rotating shaft 125 is equal to or slightly smaller than a height of the housing 123 at the rotating shaft 125, so as to prevent the protection structure 124 from escaping from the top of the rotating shaft 125 during high-speed operations.

Preferably, the head 1241 and the tail 1242 of the protection structure 124 are connected in a smooth transition manner, the head 1241 is rotatably sleeved on the rotating shaft 125 and has a first passage 171, and the tail 1242 has a second passage 172 communicating with the first passage 171, where the first passage 171 and the second passage 172 form the passage 170. The head 1241 is connected to the tail 1242 in the smooth transition manner to reduce edges and corners of the protection structure 124, form the streamlined protection structure 124, and help avoid the pneumatic noise during the operation of the trimmer line 121.

Figure 9:
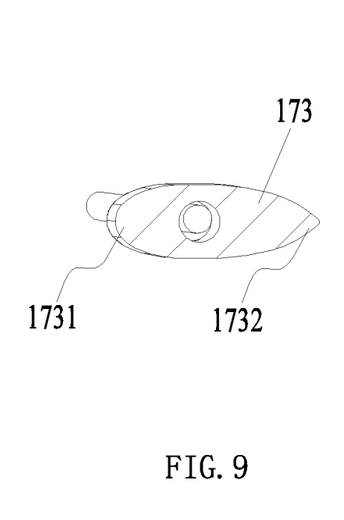
FIG. 9 is a view illustrating a section of the protection structure of the string trimmer head in FIG. 3.
Figure 10:
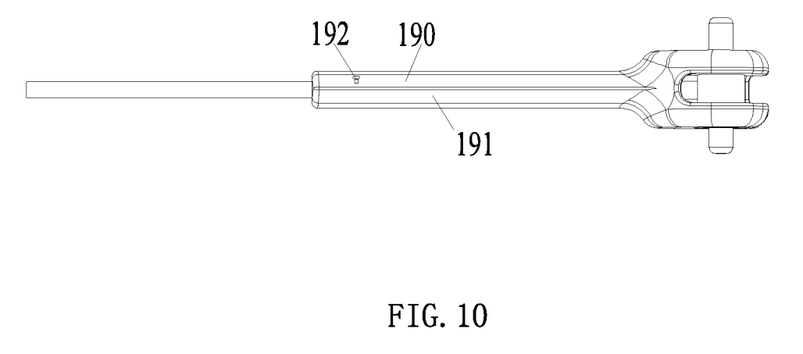
FIG. 10 is a plan view of a protection structure according to another example of the present disclosure.

Further preferably, the trimmer line 121 can rotate about the first axis 126 and form a cutting plane. Referring to FIG. 9, the tail 1242 of the protection structure 124 has at least one section 173 being a streamlined structure with a circular front 1731 and a cuspate rear 1732, and the section 173 is perpendicular to the cutting plane and sides of the protection structure 124. The air drag on the streamlined structure is small, and the streamlined structure is more in accordance with aerodynamics, thereby facilitating the reduction of the pneumatic noise. Optionally, all sections 173 of the tail 1242 are the streamlined structure with the circular front end and the cuspate rear.

In this example, the housing 123 is provided with at least two threading holes 12321 in a circumferential direction. In order to simplify the structure, preferably, two threading holes 12321 are uniformly disposed on the circumference of the housing 123, that is, the two threading holes 12321 are oppositely disposed on the housing 123, and correspondingly, two protection structures 124 are provided.

The protection structure 124 in this example is an integral structure, and the passage 170 is a through hole structure or a through groove structure penetrating the protection structure 124 in an axial direction of the protection structure 124. When the passage 170 is the through groove structure, the trimmer rope 121 is stuck in the through groove structure via an interference fit, which is convenient for the user to install the trimmer line 121 onto the protection structure 124.

Preferably, a length of the protection structure 124, that is, a distance between a tail end of the protection structure 124 and the spool 122 has a value range of 35 mm to 70 mm. The value range can avoid increased noise and a shortened service life due to too long a protection structure 124 and too high a rotation speed of the protection structure 124 on the premise that the strength of the protection structure 124 is ensured. A width of the protection structure 124 has a value range of 11 mm to 30 mm so that the visualization is ensured on the premise that structural strength is ensured. Optionally, the value range of the distance between the tail end of the protection structure 124 and the spool 122 is 35 mm to 70 mm, and the value range of the width of the protection structure 124 is 11 mm to 23 mm so that the protection structure 124 has a good noise reduction effect and a protective effect on the trimmer line 121. In order to further optimize the degree of visualization of the trimmer line 121, the protection structure 124 is provided with an identification part 180 configured to display a rotation outline of the protection structure 124. Optionally, the identification part 180 is disposed at a peripheral side of the protection structure 124 or at a tail end of the tail. The identification part 180 is provided so that the visualization of the protection structure 124 can be enhanced, and the trimming range of the trimmer line 121 can be more clearly seen by the operator.

Further, the identification part 180 includes a fluorescent coating, a light-emitting element, or a warning mark. When the identification part 180 is disposed at the peripheral side of the protection structure 124, the identification part 180 may be a relatively striking color or coating coated on the peripheral side of the protection structure 124, such as the fluorescent coating. When the identification part 180 is disposed at the tail end of the tail 1242, the identification part 180 may be the fluorescent coating or may be the light-emitting element or the warning mark.

Further preferably, the light-emitting element is a light-emitting diode (LED) light. When the trimmer line 121 reaches a certain rotation speed, the LED light is on so that a conspicuous warning ring is formed at an edge of a cutting wheel formed due to the rotation of the trimmer line 121. The warning ring is beneficial for the operator to observe the boundary of the trimmer line 121 intuitively and better manipulate the string trimmer 100, reducing damages to the string trimmer 100 and other objects within the operating range of the string trimmer 100. Optionally, the LED light may emit light in the form of a horse race lamp or in the form of flickering when emitting light. The color of the LED light may be a conspicuous and bright color such as red or fluorescent yellow and is not particularly limited in this example. The light-emitting of the LED light is known in the related art and will not be repeated here.

The warning mark includes a pattern of a special color coated on or a sticker of a striking color attached to a surface of the protection structure 124 at the tail end of the tail 1242 of the protection structure 124. With this structure, when the string trimmer 100 operates, the warning mark may also enhance the visualization and has a lower cost and a simpler structure than the light-emitting element.

In a specific configuration, the identification part 180 may use one of the fluorescent coating, the light-emitting element, or the warning mark alone or may also use a combination of three or two of the fluorescent coating, the light-emitting element, and the warning mark, which is not particularly limited in this example. It is to be noted that the form of the identification part 180 is not limited to the forms listed in this example and may also be other structural forms capable of implementing the function of identification and warning.

FIG. 9 shows another protection structure 124 that can be connected to the housing 123 of the string trimmer head 12. The protection structure 124 in this example is a separate structure. The protection structure 124 includes a first body 190 and a second body 191, where one side of the first body 190 and one side of the second body 191 are rotatably connected to each other, and the other side of the first body 190 and the other side of the second body 191 are opened and locked through a locking mechanism 192.

In actual assembly, the locking mechanism 192 is unlocked, the first body 190 and the second body 191 are opened, the trimmer line 121 is assembled into the passage 170, the first body 190 and the second body 191 are engaged with each other, and the protection structure 124 is locked by the locking mechanism, so that the trimmer line 121 is fixed through the through hole structure or the through groove structure in the protection structure 124.

Apparently, the above-mentioned examples of the present disclosure are merely illustrative of the present disclosure and are not intended to limit the examples of the present disclosure. For those of ordinary skill in the art, alterations or modifications in other different forms can be made based on the above description. Examples cannot be and do not need to be exhausted herein. Any modifications, equivalent substitutions and improvements within the spirit and principle of the present disclosure fall within the scope of the claims of the present disclosure.

What is claimed is:

1. A string trimmer, comprising:
    a connecting rod;
    an operation part disposed at an end of the connecting rod; and
    a string trimmer head disposed at an opposite end of the connecting rod, the string trimmer head comprising:
        a trimmer line,
        a spool configured to wind the trimmer line and rotatable about a first axis,
        a housing having an accommodating cavity for accommodating at least part of the spool and a threading hole for the trimmer line to extend to an outer side of the housing, and
        a protection structure defining a passage through which the trimmer line passes comprising a head and a tail, the head connected to the tail in a smooth transition manner, wherein the head is connected to the housing, the tail comprises, in cross section, a streamlined shape including a circular leading surface and a cuspate trailing surface, and the tail extends on the outer side of the housing, wherein the distal end of the tail is spaced from the spool a distance between 35 mm to 70 mm, the passage is configured to accommodate the trimmer line penetrating through the threading hole and to expose the trimmer line out of the tail of the protection structure,
    wherein the housing further comprises a side wall provided with the threading hole, a a rotating shaft is connected to the side wall of the housing and retained within the threading hole, and the head of the protection structure is rotatably sleeved to the rotating shaft within the housing so that the protection structure is rotatable relative to the housing.

2. The string trimmer of claim 1, wherein the head has a first passage, the tail has a second passage communicating with the first passage, and the first passage and the second passage form the passage.

3. The string trimmer of claim 1, wherein the protection structure is provided with an identification part configured to display a visual outline of the protection structure when the identification part is rotated relative to the housing.

4. The string trimmer of claim 3, wherein the identification part is disposed at a tail end of the tail.

5. The string trimmer of claim 3, wherein the identification part comprises one a fluorescent coating, a light-emitting element, or a warning mark.

6. The string trimmer of claim 1, wherein the passage is a through hole structure.

7. The string trimmer of claim 1, wherein the passage is a through groove structure.

8. The string trimmer of claim 1, wherein the protection structure comprises a first body and a second body and the first body and the second body are opened and locked through a locking mechanism.

9. The string trimmer of claim 1, wherein the protection structure has a width in a range of 11 mm to 30 mm.

10. The string trimmer of claim 1, wherein the protection structure is rotatably connected to the housing.

11. The string trimmer of claim 1, wherein part of the trimmer line is wound on the spool and part of the trimmer line passes through the passage.

12. The string trimmer of claim 1, wherein the string trimmer head comprises a second, streamlined protection structure.

13. The string trimmer of claim 1, wherein a vertical height of the head is larger than a vertical height of the tail, and a radial width of the head is larger than a radial width of the tail.

* * * * *